April 15, 1958 J. H. CLARK 2,831,106

STABILIZED AUTOMATIC FREQUENCY CONTROL CIRCUIT
WITH NOISE OPERATED SQUELCH

Filed Sept. 25, 1956 2 Sheets-Sheet 1

INVENTOR
J. H. CLARK
BY Hugh S. Wertz
ATTORNEY

INVENTOR
J. H. CLARK
BY Hugh S. Wertz
ATTORNEY

United States Patent Office
2,831,106
Patented Apr. 15, 1958

2,831,106

STABILIZED AUTOMATIC FREQUENCY CONTROL CIRCUIT WITH NOISE OPERATED SQUELCH

Jean H. Clark, Covina, Calif., assignor to American Telephone and Telegraph Company, a corporation of New York Application September 25, 1956, Serial No. 611,944
5 Claims. (Cl. 250—20)

This invention relates to frequency-modulated receivers and more particularly to automatic frequency control circuits for use in such receivers.

It is well known that automatic frequency control circuits respond to variations of a receiver's intermediate frequency from a reference value and produce control voltages proportional to the variations which cause the receiver to move the intermediate frequency to this reference value. The well known "capture effect" of frequency modulated receivers causes a stronger signal to suppress a weaker signal, consequently resulting in the automatic frequency control circuit following an undesired signal where it is stronger than the desired channel signal.

In such receivers a serious problem arises from interference from adjacent channels particularly where there is a narrow frequency separation between channels. Such problems arise where the amplitude of the adjacent channel signal is high due to over modulation or, particularly in mobile systems, where the receiver is geographically closer to the adjacent channel transmitter than to the transmitter of its own channel. The resultant noise or "spillover" into the receiver channel causes the automatic frequency control circuit to hunt and often to lock onto the adjacent channel, thus losing the desired signal.

It is an object of the present invention to improve frequency-modulated receiver operation by preventing an adjacent channel signal from capturing the receiver thereby reducing if not substantially eliminating the interference problem from adjacent channels.

According to this invention, "pegging" action is applied to the receiver's automatic frequency control circuit which limits the receiver frequency variation thereby preventing the receiver from following the undesired signal of an adjacent channel. Also, in the case of strong interference, the circuit of the invention operates to block or "kill" the automatic frequency control, thus preventing the receiver's oscillator frequency from being pulled toward an undesired signal. These effects substantially eliminate interference problems from adjacent channels.

In an illustrative embodiment of the invention, the center point of a double diode limiter is connected to the output of a noise amplifier such as may be included in the receiver, for example, in connection with a squelch circuit. In order to provide the limiting action the diodes are biased in the nonconducting direction by appropriate voltages. The output of the noise amplifier when of sufficient magnitude will cause the diodes to be conductive. This will effectively short circuit the automatic frequency control circuit and block its action thereby setting the receiver's local oscillator at its rest frequency.

Figure 1:
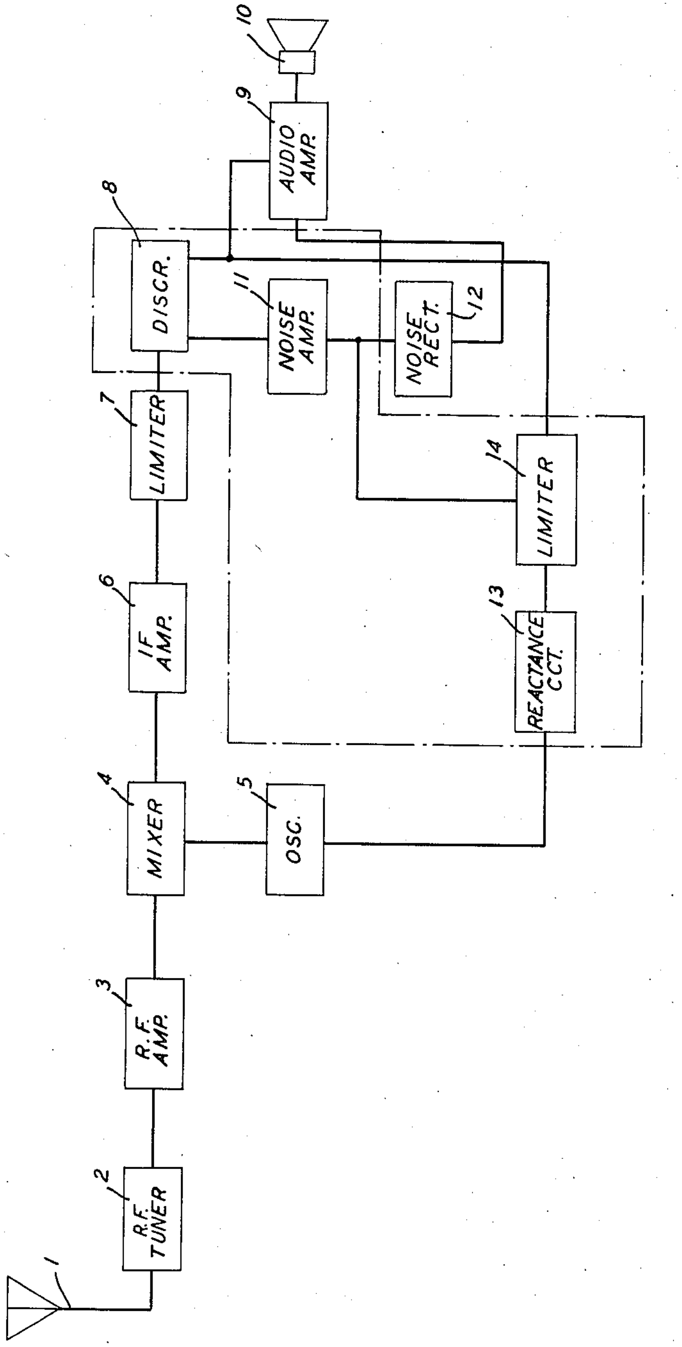
Figure 2:
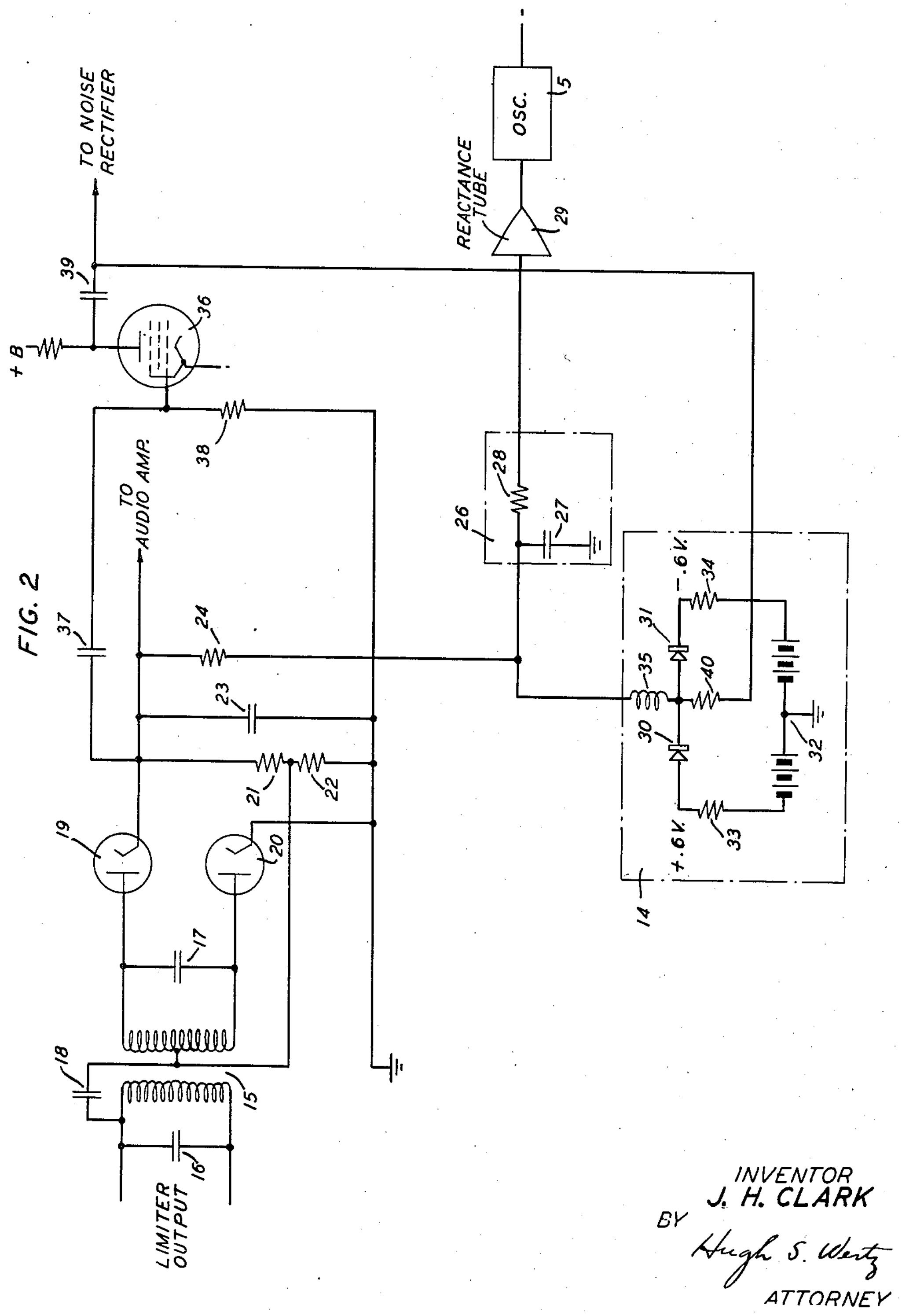

The invention will be more readily understood by referring to the following description taken in conjunction with the accompanying drawings in which:

Fig. 1 is a block diagram of a frequency-modulated receiver with the blocked out portion indicated thereon pointing out the section of the receiver to which applicant's invention particularly pertains; and Fig. 2 is a schematic circuit diagram of the blocked out portion of Fig. 1.

Referring now to Fig. 1, a frequency-modulated receiver is shown having the usual components of an antenna 1, radio-frequency tuner 2, radio-frequency amplifier 3, all of well known design, for selecting and amplifying the received signal. The receiver also employs a conventional superheterodyne process and the components included for this purpose are a mixer 4, oscillator 5, and intermediate frequency amplifier 6. Likewise, the detection process employed in the receiver, as customary in frequency-modulated receivers, includes a limiter 7, and a discriminator 8. The output of discriminator 8 is supplied to an audio amplifier 9 of well known design for supplying the detected audio signal to telephone receiver 10. There is also provided a squelch circuit comprising noise amplifier 11, noise rectifier 12 and amplifier 9. Noise amplifier 11 selects and amplifies noise signals from the output of discriminator 8. The output of noise amplifier 11 is rectified by rectifying device 12 so that the presence of a predetermined noise level will cause rectifier 12 to produce a voltage which is utilized to cut off audio amplifier 9. As is well understood in the art, the noise in the output of discriminator 8 rises markedly in the absence of incoming signals and such noise is utilized in the squelch circuit to block the output of the receiver in the absence of such incoming signals.

Applicant's invention has application to the automatic frequency control circuit of the receiver which responds to the output of discriminator 8 and includes a limiter 14 and reactance circuit 13 which control the frequency of oscillator 5. The detailed operation of the receiver as described above is well known in the art and will not be gone into in detail here.

Applicant's invention is particularly concerned with a control of the automatic frequency control circuit which is effected by a connection to the limiter circuit 14 as will be understood by reference to the schematic circuit of Fig. 2.

As shown there, discriminator 8 comprises capacitors 16, 17, and 18, transformer 15, diodes 19 and 20 and the circuit of resistors 21 and 22 in series with capacitor 23 in parallel with said resistors. Capacitors 16 and 17 are connected across the primary and second windings respectively of transformer 15. Capacitor 18 connects the high voltage side of the transformer primary to the center tap of the transformer secondary. The plates of diodes 19 and 20 are each connected to different sides of the transformer secondary. The cathode of diode 20 is connected to ground. The output of the discriminator appears across the parallel resistance-capacitance circuit of resistors 21 and 22 and capacitor 23 which is connected between the cathode of diode 19 and ground. The junction of resistors 21 and 22 is connected to the center tap of the secondary of transformer 15. The explanation for the foregoing discriminator connections is as described, for example, in "Radio Engineering," by F. E. Terman, McGraw-Hill, Third Edition, 1947, pages 522–525.

The automatic frequency control circuit is connected to the cathode of diode 19 and the circuit includes in series limiter 14, resistor 24, resistance-capacitance filter 26 and reactance tube 29. Resistor 24 in cooperation with filter 26, including capacitor 27 and resistor 28, operates to eliminate alternating signaling voltages and in effect apply only direct voltages to reactance tube 29. This tube operates to control the frequency of oscillator 5.

The limiter 14 comprises diodes 30 and 31 of Fig. 2 which have unlike electrodes connected together. The other electrodes of the diodes are all biased to place the diodes in the nonconducting state. As shown, a source of direct potential 32 is connected to the anode of diode 30 by way of resistor 33 and to the cathode of diode 31 through resistor 34. The mid-point of source 32 is grounded to form a complete circuit. It should be noted that source 32 may be eliminated by connecting resistors 33 and 34 to appropriate points in the receiver power supply to develop potentials of correct magnitude and polarity through appropriate voltage dividers. The biasing voltages for diodes 30 and 31 are of equal magnitude but of opposite polarity and in an appropriate embodiment as indicated may be +.6 volts and −.6 volts, respectively. The junction of diodes 30 and 31 is connected in the automatic frequency control circuit between resistors 24 and 28 through inductance 35.

In order to provide squelch action the cathode of diode 19 is connected to the grid of vacuum tube 36, part of an amplifier circuit, by means of capacitor 37 and resistor 38. The combination of the capacitor and resistor operates as a high pass filter to select noise frequencies above the desired audio signal from the discriminator output. The amplifier is of conventional design and amplifies the selected noise frequencies for delivery to a noise rectifier (not shown) to provide squelch action as is well understood in the art.

To provide control of the automatic frequency control action a connection is provided from the plate of the noise amplifier tube 36 through capacitor 39 and resistor 40 to the junction of the limiter diodes 30 and 31. The operation of this control circuit will now be explained with the aid of Figs. 1 and 2. Returning to Fig. 1, a desired frequency-modulated signal will be accepted by antenna 1 and radio frequency tuner 2. The frequency-modulated signal is mixed with the output of oscillator 5 in mixer 4 to produce an intermediate frequency which falls within the pass band of amplifier 6 so that the frequency may be amplified. Limiter 7 removes amplitude-modulated noise signals in the intermediate frequency, and the limiter's output is supplied to discriminator 8 for detection purposes. It is necessary for proper operation of the receiver that the intermediate frequency be within the pass band of amplifier 6. The automatic frequency control circuit operates to achieve this object.

The characteristic of discriminator 8 is such that a direct voltage is produced when the intermediate frequency of the receiver varies from the reference or center frequency of amplifier 6. The voltage is directly proportional to the frequency difference between the intermediate frequency and the center frequency, and it has a polarity according to whether the intermediate frequency is above or below the center frequency. This direct voltage is applied to reactance circuit 13, via limiter 14, and by its operation the output frequency of oscillator 5 is controlled so that the heterodyne output of mixer 4 is held at the center frequency of amplifier 6 to return the direct voltage output of discriminator 8 to zero.

Turning now to Fig. 2 it is evident that the junction of diodes 30 and 31 is connected to the output of the discriminator through inductance 35 and that the diodes are in their nonconducting state as a result of the bias voltages. As the discriminator direct voltage output varies in either direction one diode will be caused to conduct when its bias voltage is exceeded. The conducting diode places a low resistance path across the discriminator direct voltage ouput which prevents further increase in the output voltage. In effect, the direct voltage output of the discriminator is limited in both directions to the bias voltages of the diodes. Hence the voltage applied to reactance tube 29 is restricted to the boundaries set by the biasing of diodes 30 and 31 which limits the range of control of the frequency of oscillator 5. Thus, the diode arrangement prevents the automatic frequency control circuit from causing the receiver to lock in on an adjacent channel where in the process the bias voltage of a diode will be exceeded.

Noise frequencies in the discriminator output are selected by capacitor 37 and resistor 38 and amplified by the action of tube 36 and accompanying circuitry (not shown). The amplified noise voltage appears at the plate of tube 36 as an alternating voltage. As stated, the junction of diodes 30 and 31 is connected to the plate of tube 36 through resistor 40 and capacitor 39. The combination of the resistor and capacitor acts as a filter to limit the amount of energy that may be drawn from tube 36 so that the normal action of the tube in supplying the squelch circuit is not impaired. As the output of tube 36 increases, the diodes will be caused to conduct when their bias voltages are exceeded by the alternating noise voltage. The conducting action of diodes 30 and 31 causes the junction of the diodes to assume the average potential between the bias voltages which is zero volts or ground potential. Since limiter 14 is in series with the discriminator, the voltage applied to the grid of reactance tube 29 is pulled toward the junction potential of the diodes which is zero volts. With no voltage applied to reactance tube 29 the output of oscillator 5 is set at its nominal or rest frequency thereby nullifying any automatic frequency control action.

Thus, when the receiver is operating with no signal being transmitted a high noise voltage condition exists which holds the junction of diodes 30 and 31 at zero volts. In this case, the receiver is held at the assigned center frequency of the receiver. Without this feature the receiver would hunt and an adjacent channel signal spilling over into the receiver's channel might produce automatic frequency control action which would cause the receiver to be pulled to the interfering signal.

In the case where both the desired and undesired channels are in operation, an undesired signal that is overmodulated produces frequency components in the desired channel which appear as "hiss" or "sideband splatter" in the receiver's output. If these noise voltages are of sufficient level diodes 30 and 31 start to conduct and the discriminator voltage is pulled toward ground potential thus holding the receiver's intermediate frequency at its nominal value to prevent the receiver from being pulled to the interfering signal.

In view of the foregoing, it is evident that applicant's invention enables a frequency-modulated receiver to employ automatic frequency control under normal operating conditions and prevents it from causing faulty operation by adjacent channel interference. Further, the invention permits more widespread use of the radio spectrum since it permits frequency separation between channels to be reduced below that which can be successfully utilized by present receivers.

It is to be understood that the invention has been described above with reference to a specific automatic frequency control circuit for the purpose of explaining its principles and features of operation and that the invention is not to be restricted to this particular embodiment but is to be limited only by the claims.

What is claimed is:

1. A superheterodyne radio receiver for frequency-modulated signals comprising a local oscillator, means for combining the received frequency-modulated signal and the output of the oscillator to yield an intermediate frequency, amplifying means selectively responsive to the intermediate frequency, discriminator means coupled to the amplifying means for detecting said frequency-modulated signal and to produce a direct current varying about a mean value as the intermediate frequency varies about the center frequency of said amplifying means, means for selecting and amplifying oscillations representing noise of frequencies above the signal band appearing in said receiver, signal amplifying and reproducing means for receiving the detected signal, electronic means for controlling the frequency of said oscillator in response to the direct current output of the discriminator, means to limit the range of said direct current output applied to said electronic means, and means responsive to said noise above a predetermined level for rendering inoperative said electronic means.

2. A superheterodyne radio receiver for frequency-modulated signals as defined in claim 1 wherein the limiting means comprises rectifying units normally biased to their nonconducting state, and said means for rendering inoperative said electronic means comprises means for supplying the amplified noise oscillations to said rectifying units to render said rectifying units conductive.

3. A superheterodyne radio receiver for frequency-modulated signals as defined in claim 1 wherein the limiting means comprises at least two rectifying units having unlike electrodes connected together, means for applying predetermined bias voltages to the rectifying units to normally maintain said units in their nonconducting state, and said means for rendering inoperative said electronic means comprises means for supplying the amplified noise oscillations to said rectifying units to render the units conductive when the amplitude of said noise oscillations exceeds a predetermined minimum.

4. In a superheterodyne radio receiver for frequency-modulated signals, a beating oscillator, electronic means for controlling the frequency of said oscillator in response to voltages varying oppositely from a mean value, a mixer for combining received signals with the output from said oscillator, an intermediate frequency amplifier selectively responsive to the output of said mixer, means for producing a direct current voltage varying about said mean value as the frequency of the output of said mixer varies about the nominal frequency of said intermediate frequency amplifier, connections for supplying said voltage to control said electronic means including a limiter circuit comprising two oppositely poled diodes each normally biased to a nonconducting state, means for selecting from said receiver oscillations representing noise at frequencies above the signal band, and means for supplying the noise oscillations to the limiter diodes to hold the output of said limiter at said mean value in the presence of such noise oscillations.

5. A stabilized automatic frequency control circuit comprising a discriminator for demodulating input signals and producing a direct current voltage proportional to the difference between an arbitrarily selected fresuency and the input carrier frequency, a reactance tube for receiving said direct current voltage, means connected to the discriminator output for selecting noise frequencies in the demodulated signal, means for amplifying said noise frequencies, and means connected between the discriminator output and the reactance tube to limit the direct current voltage at the discriminator output and to cancel said direct current output when the noise amplifier output exceeds a predetermined level.

References Cited in the file of this patent

UNITED STATES PATENTS

| | | |
|---|---|---|
| 2,433,350 | Earp | Dec. 30, 1947 |
| 2,691,097 | Atwood | Oct. 5, 1954 |

FOREIGN PATENTS

| | | |
|---|---|---|
| 149,690 | Australia | Sept. 15, 1949 |
| 711,157 | Great Britain | June 23, 1954 |